United States Patent
Feldman et al.

(10) Patent No.: US 8,032,699 B2
(45) Date of Patent: Oct. 4, 2011

(54) SYSTEM AND METHOD OF MONITORING DATA STORAGE ACTIVITY

(75) Inventors: Timothy Richard Feldman, Louisville, CO (US); Edwin Scott Olds, Fort Collins, CO (US); Jonathan Williams Haines, Boulder, CO (US); Daniel Joseph Coonen, Longmont, CO (US)

(73) Assignee: Seagate Technology LLC, Scotts Valley, CA (US)

( * ) Notice: Subject to any disclaimer, the term of this patent is extended or adjusted under 35 U.S.C. 154(b) by 201 days.

(21) Appl. No.: 11/764,118

(22) Filed: Jun. 15, 2007

(65) Prior Publication Data

US 2008/0313396 A1 Dec. 18, 2008

(51) Int. Cl.
*G06F 13/00* (2006.01)
(52) U.S. Cl. .............. 711/113; 711/209; 711/E12.019
(58) Field of Classification Search .......... 711/112, 711/158, 159, 171; 707/E17.12; 358/403
See application file for complete search history.

(56) References Cited

U.S. PATENT DOCUMENTS

| | | | |
|---|---|---|---|
| 5,754,888 A * | 5/1998 | Yang et al. | 710/52 |
| 5,778,418 A | 7/1998 | Auclair et al. | |
| 5,860,083 A | 1/1999 | Sukegawa | |
| 6,016,530 A | 1/2000 | Auclair et al. | |
| 6,260,115 B1 * | 7/2001 | Permut et al. | 711/134 |
| 6,295,594 B1 * | 9/2001 | Meier | 711/171 |
| 6,463,509 B1 | 10/2002 | Teoman et al. | |
| 6,937,411 B2 | 8/2005 | Goodman et al. | |
| 6,968,423 B2 * | 11/2005 | Coker et al. | 711/113 |
| 7,127,549 B2 | 10/2006 | Sinclair | |
| 7,136,973 B2 | 11/2006 | Sinclair | |
| 7,360,042 B2 * | 4/2008 | Chen et al. | 711/159 |
| 7,437,502 B1 * | 10/2008 | Coker | 711/112 |
| 2003/0135729 A1 * | 7/2003 | Mason et al. | 713/2 |
| 2005/0235119 A1 * | 10/2005 | Sechrest et al. | 711/158 |
| 2007/0143552 A1 * | 6/2007 | Rastogi et al. | 711/154 |
| 2007/0174582 A1 * | 7/2007 | Feldman | 711/202 |
| 2007/0220402 A1 * | 9/2007 | Hagi et al. | 714/766 |
| 2009/0172345 A1 * | 7/2009 | Allen et al. | 711/208 |
| 2009/0300318 A1 * | 12/2009 | Allen et al. | 711/206 |

* cited by examiner

*Primary Examiner* — Matt Kim
*Assistant Examiner* — Sean D Rossiter
(74) *Attorney, Agent, or Firm* — McCarthy Law Group

(57) ABSTRACT

Systems and methods of monitoring logical block address (LBA) activity are disclosed. In an embodiment, a pattern of a data storage device may be monitored. An LBA may be detected that is accessed based on the pattern. The LBA may be added to a list of LBAs stored in a memory.

16 Claims, 6 Drawing Sheets

SYSTEM AND METHOD OF MONITORING DATA STORAGE ACTIVITY

FIELD OF THE DISCLOSURE

The present disclosure is generally related to monitoring data storage activity.

BACKGROUND

Metrics can be used to measure factors affecting a user's experience with an electronic device. For portable devices, battery life and data access time are important to many users. Battery life can be extended by configuring portable devices to hibernate or enter a reduced activity state during periods of inactivity. However, when a user is ready to resume using a portable device, an extended delay in restoring the device to a pre-hibernation state can negatively impact the user's experience. Hence, there is a need for an improved system and method of monitoring data storage activity.

SUMMARY

In an embodiment, a method is disclosed that includes monitoring a pattern of data access of a data storage device. The method may also include detecting at least one logical block address (LBA) that is accessed based on the pattern. The method may further include adding the at least one LBA to a list of LBAs stored in a memory.

In another embodiment, a method is disclosed that includes storing first data in a first portion of memory in a data storage device when a first logical block address (LBA) corresponding to the first data is determined to have been previously accessed within a time period after start-up of the data storage device. The method may also include mapping the first LBA to a first physical block address (PBA) of the first portion that corresponds to the first data. A controller of the data storage device may determine when the first LBA has been previously accessed based on historical data corresponding to previous start-ups of the data storage device. The historical data may be maintained by the controller.

In another embodiment, a device is disclosed that includes a first data storage medium. The device may also include a controller adapted to store data in the first data storage medium. The device may further include a memory accessible by the controller. The memory may include instructions to cause the controller to execute a method that includes monitoring a pattern of data access of the data storage medium. The method may also include detecting at least one logical block address (LBA) associated with the data storage medium that is accessed based on the pattern. The method may further include adding the at least one LBA to a list of LBAs stored in the memory.

In another embodiment, a computer-readable medium is disclosed that has instructions to cause a processor to execute a method that includes identifying a pattern of logical block addresses (LBAs) associated with a data storage device that are accessed as a result of a transition of a host device from a not-ready state to a ready state. The method may also include storing the pattern of LBAs in a memory of the data storage device. The method may be executed by a controller integral to the data storage device.

DETAILED DESCRIPTION

Figure 1:
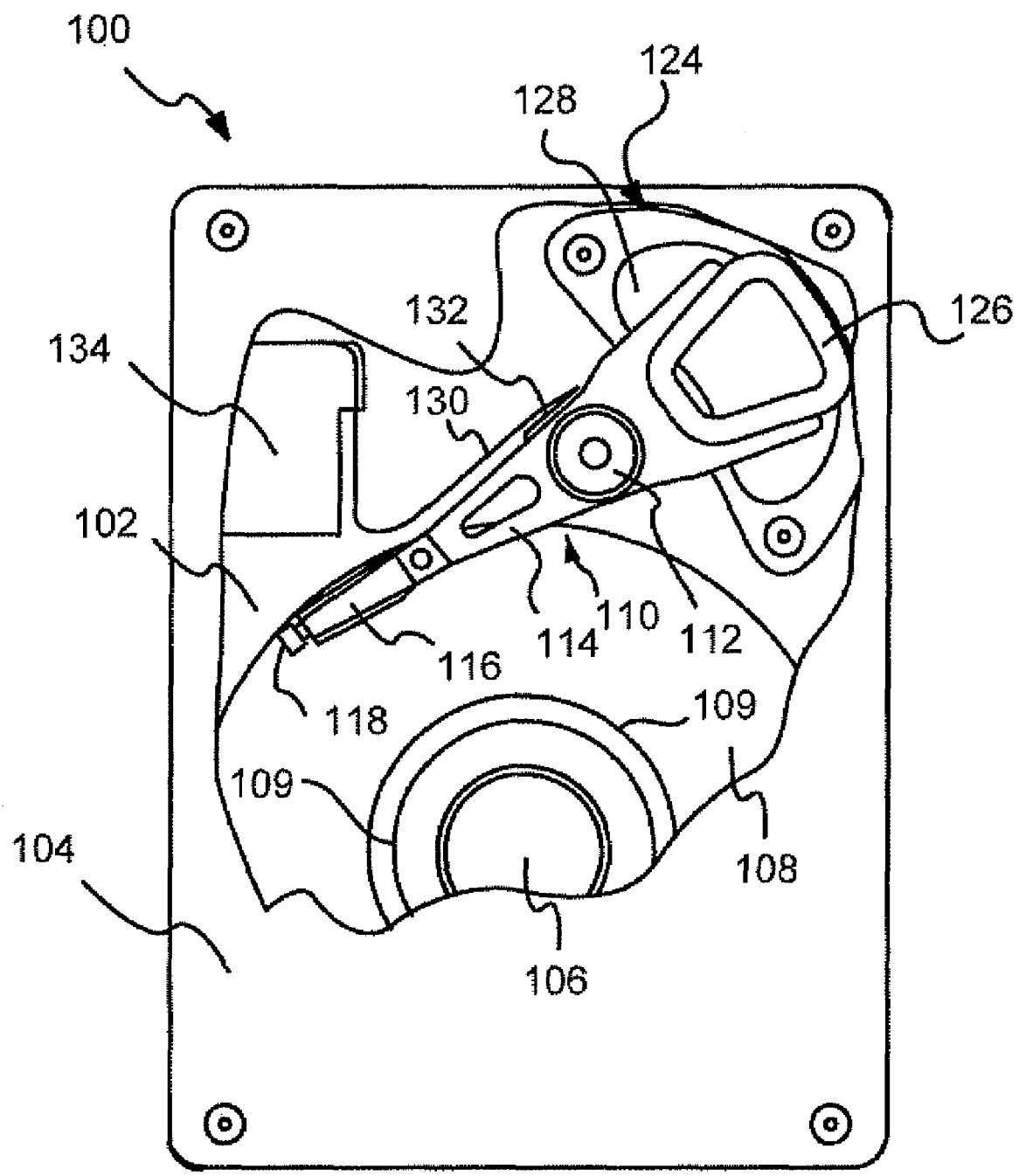
FIG. 1 is a cutaway view of an illustrative embodiment of a disc drive.

Referring to FIG. 1, in a particular embodiment, a disc drive 100 includes a base 102 to which various components of the disc drive 100 are mounted. A top cover 104, shown partially cut away, cooperates with the base 102 to form an internal, sealed environment for the disc drive. The components of the disc drive 100 include a spindle motor 106, which rotates at least one disc 108. Information is written to and read from tracks on the disc 108 through the use of an actuator assembly 110 that rotate about a bearing shaft assembly 112 positioned adjacent the discs 108. The actuator assembly 110 includes one or more actuator arms 114 that extend toward the disc 108, with one or more flexures 116 extending from the actuator arms 114. Mounted at the distal end of each of the flexures 116 is a head 118 including an air bearing slider (not shown) that enables the head 118 to fly in close proximity above the corresponding surface of the disc 108.

The track position of the heads 118 is controlled, during a seek operation, through the use of a voice coil motor (VCM) 124 that typically includes a coil 126 attached to the actuator assembly 110, as well as one or more permanent magnets 128 that establish a magnetic field in which the coil 126 is immersed. The controlled application of current to the coil 126 causes magnetic interaction between the permanent magnets 128 and the coil 126 so that the coil 126 moves in accordance with the well-known Lorentz relationship. As the coil 126 moves, the actuator assembly 110 pivots about the bearing shaft assembly 112, and the heads 18 are caused to move across the surfaces of the disc 108.

A flex assembly 130 provides requisite electrical connection paths for the actuator assembly 110 while allowing pivotal movement of the actuator assembly 110 during operation. The flex assembly 130 can include a printed circuit board 132 to which head wires (not shown) are connected. The head wires may be routed along the actuator arms 114 and the flexures 116 to the heads 118. The printed circuit board 132 may include circuitry for controlling the write currents applied to the heads 118 during a write operation and a preamplifier (not shown) for amplifying read signals generated by the heads 118 during a read operation. The flex assembly 130 terminates at a flex bracket 134 for communication through the base 102 to a disc drive printed circuit board (not shown) mounted to the disc drive 100.

As shown in FIG. 1, a plurality of nominally circular, concentric tracks 109 are located on the surface of the disc 108. Each track 109 includes a number of servo fields that are interspersed with user data fields along the track 109. The user data fields are used to store user data, and the servo fields are used to store servo information used by a disc drive servo system to control the position of the heads 118.

Figure 2:
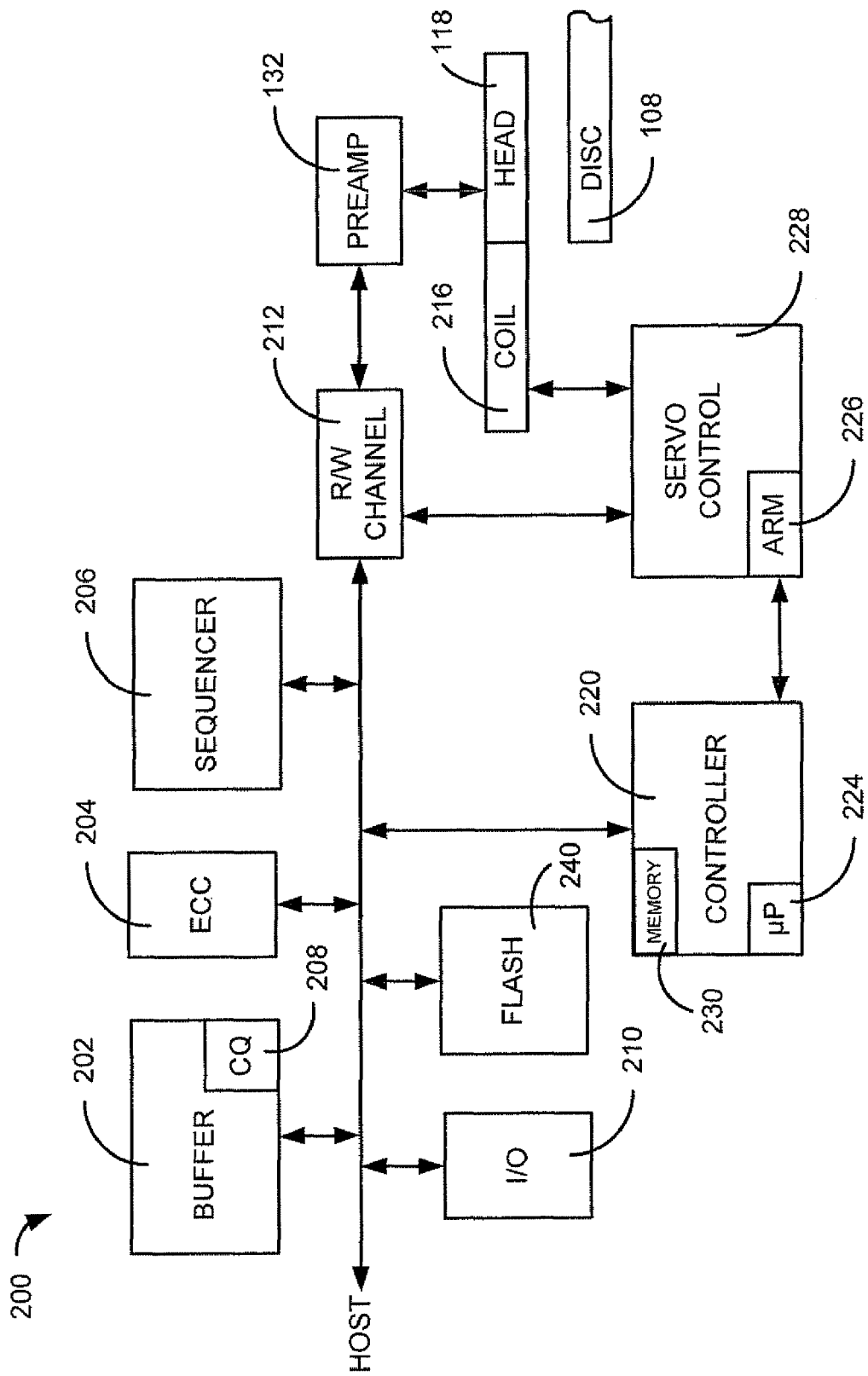
FIG. 2 is a block diagram of an illustrative embodiment of a disc drive system.

FIG. 2 provides a functional block diagram of the disc drive 100. A hardware/firmware based interface circuit 200 communicates with a host device (such as a personal computer, not shown) and directs overall disc drive operation. The interface circuit 200 includes a programmable controller 220 with associated microprocessor 224 and memory 230. The interface circuit 200 also includes a buffer 202, an error correction code (ECC) block 204, a sequencer 206, and an input/output (I/O) control block 210.

The buffer 202 temporarily stores user data during read and write operations, and includes a command queue (CQ) 208 where multiple pending access operations are temporarily stored pending execution. The ECC block 204 applies on-the-fly error detection and correction to retrieved data. The sequencer 206 asserts read and write gates to direct the reading and writing of data. The 110 block 210 serves as an interface with the host device.

FIG. 2 further shows the disc drive 100 to include a read/write (R/W) channel 212 which encodes data during write operations and reconstructs user data retrieved from the disc 108 during read operations. A preamplifier/driver circuit (preamp) 132 applies write currents to the heads 118 and provides pre-amplification of readback signals.

A servo control circuit 228 uses servo data to provide the appropriate current to the coil 216 to position the heads 118. The controller 220 communicates with a processor 226 to move the heads 118 to the desired locations on the disc 108 during execution of the various pending commands in the command queue 208.

In a particular embodiment, a solid state non-volatile memory device, such as a flash memory 240, may be configured to provide an additional data storage medium. The solid state non-volatile memory device may have a faster access time than the disc 108. The solid state non-volatile memory device may be a random access storage device.

The memory 230 of the controller 220 may be configured to include data and instructions that are executable by the microprocessor 224. In a particular embodiment, the controller 220 may be configured to initiate a transition of the disc 108 from a not-ready state to a ready state to perform data operations. The controller 220 may also be configured to initiate a transition of the disc 108 to a not-ready state to reduce power usage. The controller 220 may also be configured to store data corresponding to a state of the host device and to enter the not-ready state in response to a hibernation of the host device.

In a particular embodiment, the controller 220 may be configured to detect logical block addresses (LBAs) that are accessed by the host device. The controller 220 may be configured to use the memory 230 to store LBA access data. The LBA access data may include historical LBA access activity based on a time period, based on one or more events, based on other criteria, or any combination thereof. For example, the LBA access data may be stored after a specific instruction is received by the controller 220. In a particular embodiment, the LBA access data may be stored based on a shifting window of time.

In a particular embodiment, an access count may be stored for each LBA based on accesses of the LBA during multiple previous transitions from a not-ready state to a ready state of the disc drive 200. The controller 220 may be configured to store one or more LBA access patterns that correspond to previous transitions from the not-ready state to the ready state. A number of the LBA access patterns may be stored based on an order of the corresponding previous transitions.

In a particular embodiment, the controller 220 may be configured to maintain a list of LBAs. The controller 220 may also be configured to detect occurrences of LBAs in stored LBA access patterns and to add one or more LBAs to the list based on their occurrences. Further, the controller 220 may be configured to modify the list to adjust a statistical weighting of a particular LBA based on accesses of data corresponding to the LBA. In a particular embodiment, the controller 220 may be configured to add one or more LBAs to the list based on LBAs accessed during a transition to a ready state.

In a particular embodiment, the controller 220 may be configured to receive LBA access data via a modified Directed Offline Scan technique that counts read accesses to a range of logical locations to determine count aging in order to identify most recently and most frequently used blocks. The controller 220 may be configured to perform cache replacement techniques, such as least recently used (LRU), least frequently used (LFU), other operations, or any combination thereof, to determine LBA access activity. The controller 220 may be configured to create, modify, or supplement the list of LBAs based on the determined LBA access activity.

In a particular embodiment, the controller 220 may be configured to select, based on the list, one or more portions of the disc 108, the flash memory 240, or any combination thereof, for storing data. The selection may be made to improve the performance when accessing the LBAs on the list. Thus, the controller 220 may control the logical-to-physical mapping of the LBAs in the list to provide an optimized performance and quality of service. In a particular embodiment, such mapping may include optimized ordering when a data storage medium is not random access.

In a particular embodiment, data associated with LBAs of the list of LBAs may be stored at the flash memory 240 for faster retrieval, such as during a transition from a not-ready state to a ready state. In a particular embodiment, the flash memory 240 and the disc 108 may be part of a hybrid disc drive, and data may be stored at the flash memory 240 based on a determination of the controller 220 only, and not based on a determination of a host system or an operating system of the host system.

In a particular embodiment the controller 220 may be configured to detect and store data that is frequently accessed during start-up at a first discrete portion of the disc 108, and to store data not frequently accessed during start-up at a second discrete portion of the disc 108. For example, to improve performance, the controller 220 may be configured to: store redundant copies of data at alternate rotational positions to reduce read latency, such as with a self-mirroring drive and system metadata; store data where bit density is high to increase throughput; store data where track-to-track logical skew is low to increase throughput; store data to regions of lower error rates to reduce a number of retries; store data in alternate low latency media, such as a high spin rate disc in a multiple HDA drive; or any combination thereof.

As another example, to improve reliability, the controller 220 may be configured to: store redundant copies of data, such as with a self-mirroring drive and system metadata; store additional parity information, such as with compressed data stored to fixed size sectors; store data where data track density is relaxed; store data in one or more regions where not all data tracks are used, such as with double- or triple-pitched partitions; store data in one or more regions where bit density is relaxed; store data in one or more regions where channel parameters, such as head skew and fly height, are improved; or any combination thereof.

Figure 3:
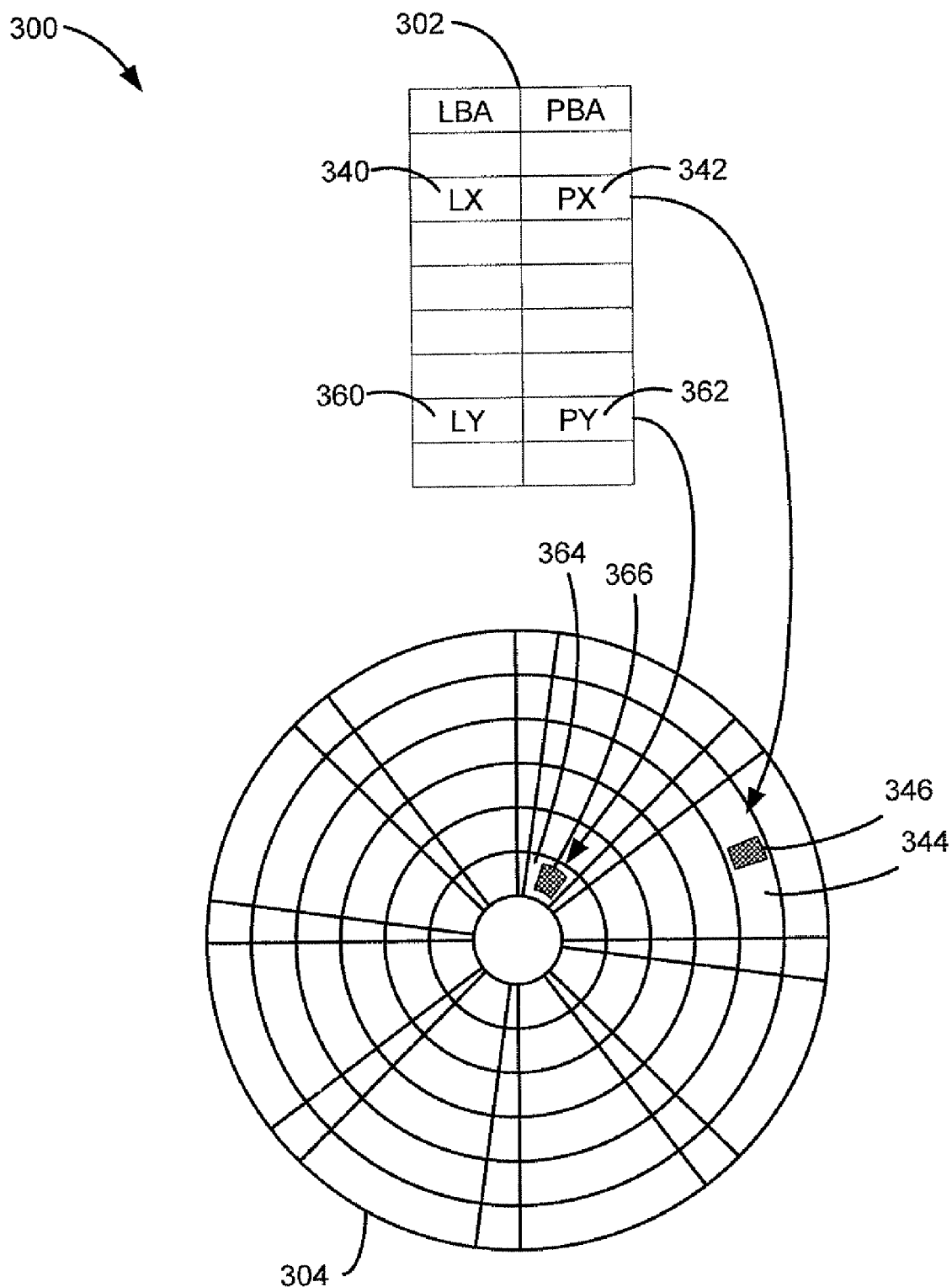
FIG. 3 is a diagram of a particular illustrative embodiment of a system to monitor data storage activity.

Referring to FIG. 3, an embodiment of a system to monitor data storage activity is depicted and generally designated 300. The system 300 includes a table 302 to map logical block addresses (LBAs) to physical block addresses (PBAs) corresponding to a storage medium 304. In a particular embodiment, the storage medium 304 may be the disc 108 shown in FIG. 1 and FIG. 2.

In a particular embodiment, first data 346 may be stored at a first memory portion 344 of the storage medium 304. The first data 346 may be accessed by a host device or other system via a request including a first LBA "LX." The table 302 may he searched for the entry "LX" 340, and a corresponding PRA "PX" 342 may be determined. PX may identify the first memory portion 344 to enable access to the first data 346. Similarly, a request for second data 366 including a second LBA "LY" may result in a search of the table 302 for the entry "LY" 360. and a corresponding PBA "PY" 362 may identify a second memory portion 364 of the storage medium 304 having the second data 366.

In a particular embodiment, it may be determined that the first LBA "LX" is frequently accessed, such as when the first data 346 is used by a portable host device when transitioning from a hibernation mode. In another particular embodiment, the first LBA "LX" may be accessed during a transition of an operating system from a not-ready state to a ready state, such as when an operating system resets or when the operating system suspends a hibernation mode.

In a particular embodiment when the first memory portion 344 of the storage medium 304 has a slower access time than the second memory portion 364, a system performance metric may be improved by storing the first data 346 to the second memory portion 364. By updating the table 302 to associate the "LX" LBA with the "PY" PBA corresponding to the second memory portion 364, the relocation of the first data 346 to the second memory portion 364 may be transparent to the host.

Similarly, other data, such as the second data 366, may be copied or transferred to other memory portions of the storage medium 304. For example, all stored data associated with PX may be copied to PY and all stored data associated with PY may be copied to PX by using at least one intermediate storage medium, to improve one or more system performance metrics, such as start-up time for a host to recover from a reset or hibernation mode. Other non-limiting examples of system performance metrics include a time for a system to respond, such as when a menu or desk-top is requested, or a time for rendering, such as with music, images, or video.

Although the first memory portion 344 and the second memory portion 364 of the storage medium 304 are depicted as sectors of a single disc, it should be understood that the system 300 may include any type of storage medium or combination of one or more types of storage media. As an example, one or more of the memory portions 344 and 364 may be non-volatile solid-state storage media, such as Dynamic Random Access Memory (DRAM) or flash memory, or optical storage media, other magnetic storage media, any other type of media that can store data, or any combination thereof In a particular embodiment, the first memory portion 344 comprises at least one sector of a magnetic data storage medium and the second memory portion 364 comprises a non-volatile solid state storage media, such as a flash memory. Further, in a particular embodiment, the table 302 may associate multiple LBAs to a single PBA, or a single LBA to multiple PBAs, or both.

Figure 4:
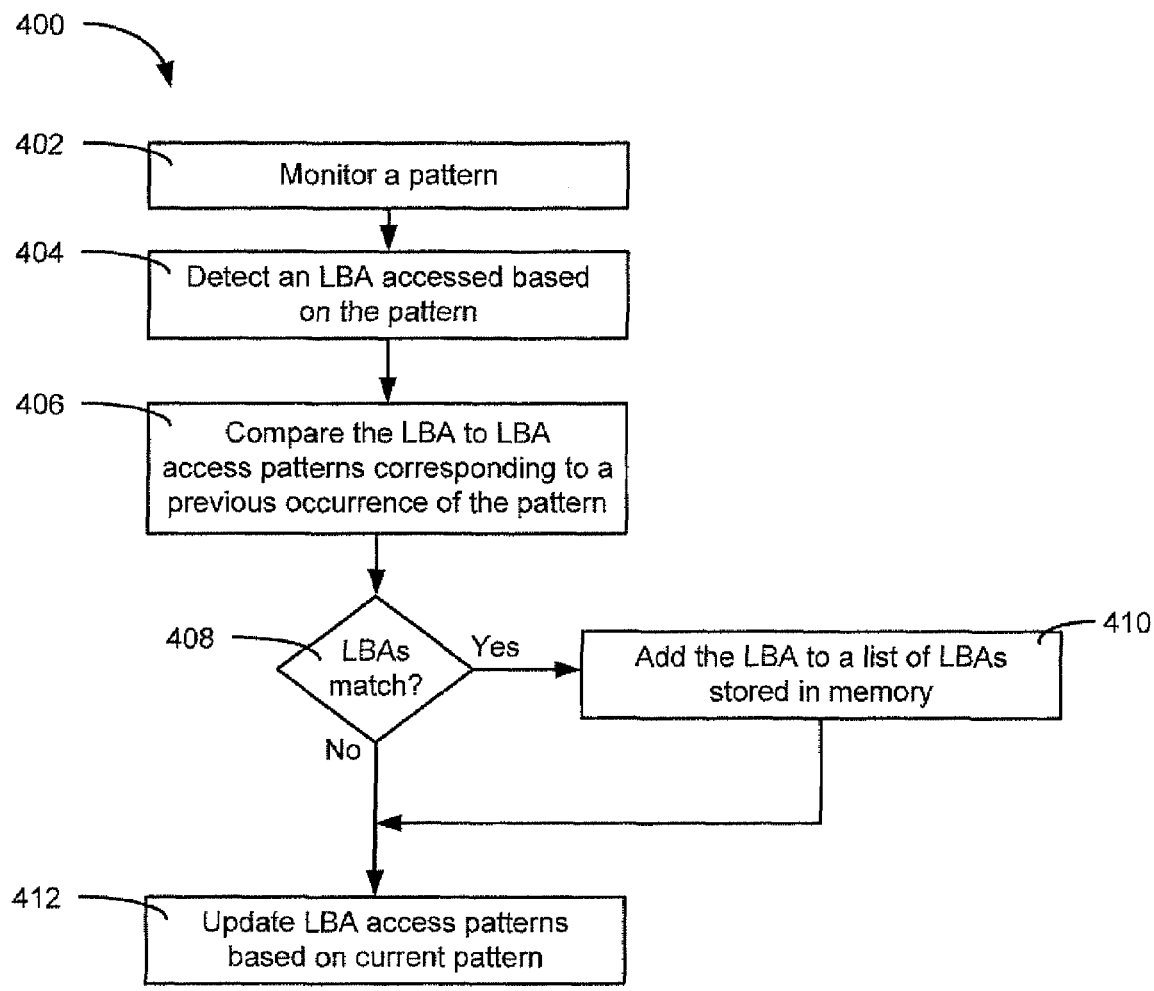
FIG. 4 is a flow diagram of a particular illustrative embodiment of a method of monitoring data storage activity.

Referring to FIG. 4, a flow diagram of an embodiment of a method of monitoring data access activity is depicted and generally designated 400. The method 400 includes monitoring a pattern of data access, at 402. The pattern may correspond to one or more events associated with access of data at a storage device. For example, the pattern may relate to data accesses over a window of time, received commands, inter-command times, other data access events, or any combination thereof. In a particular embodiment, the pattern may include LBAs access during a transition of an operating system from a not-ready state to a ready state.

The method 400 also includes detecting at least one logical block address (LBA) that is accessed based on the pattern, at 404. The at least one LBA may be compared to one or more previous LBAs accessed during a previous occurrence of the pattern, at 406. In a particular embodiment. when the LBAs match. at 408. the at least one LEA may be added to a list of LBAs stored in a memory. at 410. The list of LBAs may allow for the data storage device to identify an LBA for which techniques to improve performance or quality of service may be beneficial. For example, the data storage device may copy or move the data associated with the LBAs on the list to a data storage medium having a faster access time. In a particular embodiment, the data associated with the LBAs on the list may be stored in a solid state non-volatile memory, such as a flash memory. In another particular embodiment, the data associated with the LBAs on the list may be data to allow an operating system to recover from a hibernation mode.

The method 400 may also include updating the LBA access patterns based on the current pattern, at 412. For example, data may be stored based on a first number of LBAs accessed, based on a period of time, or both.

In a particular embodiment, all or part of the method may be performed by one or more controllers or other devices integral to the data storage device, and not performed by an operating system of a host computer connected to the data storage device. As an illustrative, non-limiting example, a controller internal to the data storage device, such as the controller 220 of FIG. 2, may detect LBAs that are accessed based on the pattern. In a particular embodiment, the initiating, the detecting, and the adding may be performed by the data storage device, and an identification of the at least one LBA is not provided to the data storage device via an external device, such as a host computer.

Figure 5:
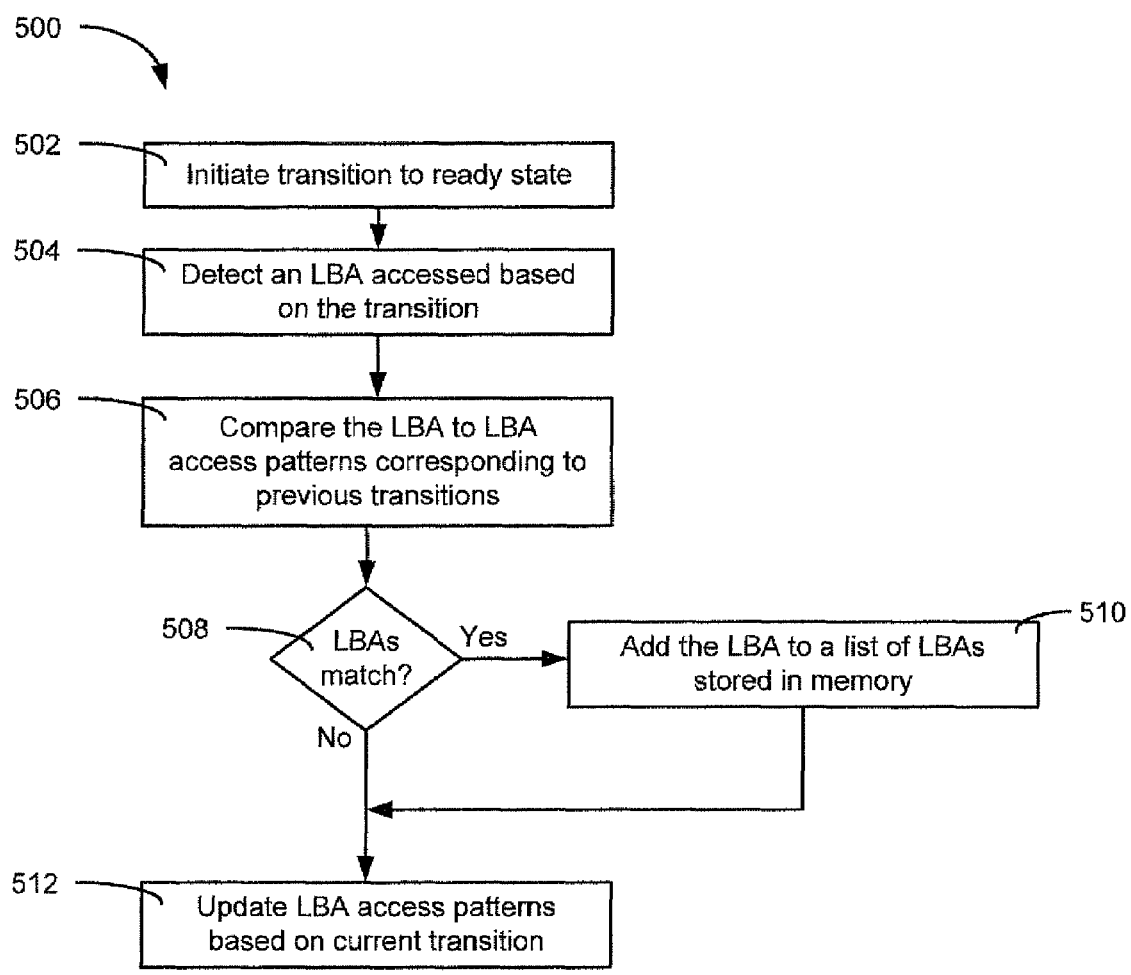
FIG. 5 is a flow diagram of another illustrative embodiment of a method of monitoring data storage activity.

Referring to FIG. 5, a flow diagram of an embodiment of a method of monitoring data access activity is depicted and generally designated 500. The method 500 includes initiating a transition of a data storage device from a not-ready state to a ready state, at 502. In a particular embodiment, the transition may be initiated by an operating system of a host computer coupled to the data storage device.

The method 500 also includes detecting at least one logical block address (LBA) that is accessed based on the transition, at 504. In a particular embodiment, the at least one LBA may be associated with data at a physical block address (PBA) of a rotatable data storage medium. In another particular embodiment, the data associated with the LBAs on the list may be data to allow the operating system to recover from a reset or a hibernation mode. In yet another particular embodiment, the at least one LBA may be accessed after the data storage device is in the ready state.

The method 500 also includes comparing the at least one LBA to a previous LBA accessed during a previous transition of the data storage device from the not-ready state to the ready state, at 506. In a particular embodiment, the at least one LBA may be compared to an LBA access pattern corresponding to a time period after initiating a previous transition. For example, the LBA access pattern may include LBAs accessed during a period of time following the transition.

In a particular embodiment, when the LBAs match, at 508, the at least one USA may be added to a list of LBAs stored in a memory, at 510. The at least one LBA may be added to the list of LBAs when a similarity between the at least one LBA and a LBA access pattern is detected. In a particular embodiment, the similarity may include one or more occurrences of the at least one LBA in the LBA access pattern.

The method 500 may also include updating one or more LBA access patterns based on the current transition, at 512. For example, data may be stored based on a first number of LBAs accessed, based on a period of time, or both. As another example, when an ordered set of LBA access patterns are stored based on a number of previous transitions, a most recent access pattern may be stored and an earliest access pattern may be erased or overwritten.

In a particular embodiment, all or part of the method may be performed by one or more controllers or other devices integral to the data storage device, and not performed by an operating system of a host computer connected to the data storage device. As an illustrative, non-limiting example, a controller internal to the data storage device, such as the controller 220 of FIG. 2, may detect LBAs that are accessed. In a particular embodiment, the initiating, the detecting, and the adding may be performed by the data storage device, and an identification of the at least one LBA is not provided to the data storage device via an external device, such as a host computer.

Figure 6:
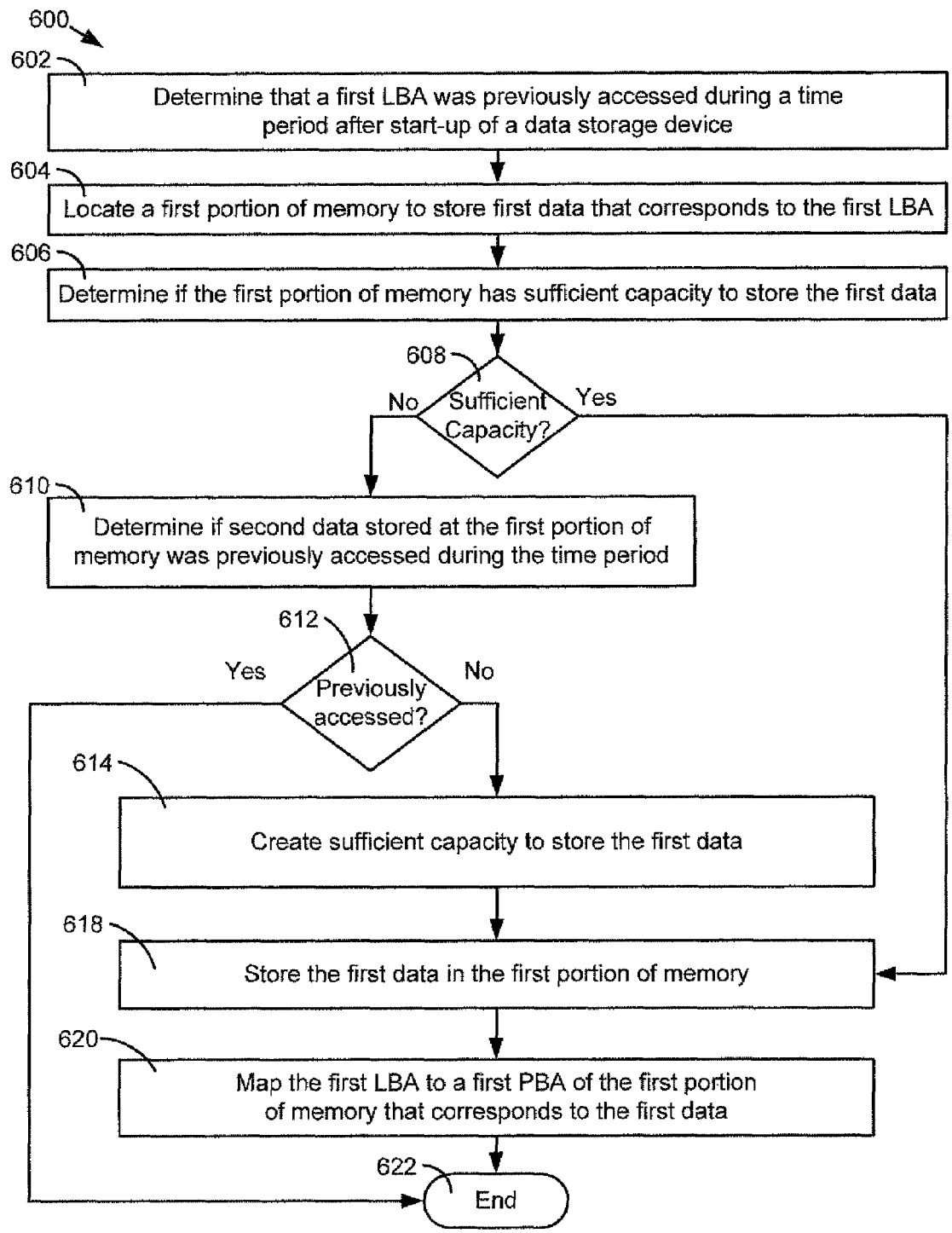
FIG. 6 is a flow diagram of another illustrative embodiment of a method of monitoring data storage activity.

Referring to FIG. 6, a flow diagram of another embodiment of a method of monitoring logical block address activity is depicted and generally designated 600. In a particular embodiment a determination may be made that a first logical block address (LBA) was previously accessed during a time period after start-up of a data storage device, at 602. In a particular embodiment, the first LBA may have been accessed during a transition of an operating system from a not-ready state to a ready state.

Performance at start-up of the data storage device may be improved by moving data frequently accessed at start-up to locations having faster access times. A first portion of memory may be located to store first data that corresponds to the first LBA, at 604. The first portion of memory may be located at a first physical block address (PBA), and the first data may be currently stored in a second portion of memory having a second PBA. The first and second portions of memory may be distinct portions of a single data storage medium, or may be located at separate data storage media. The first portion of memory may enable faster access to data than the second portion of memory. In a particular embodiment the first portion of memory comprises a non-volatile solid state memory device, such as a flash memory, and the second portion of memory comprises a storage device with a latency to access data that is larger than the non-volatile solid state memory device, such as a disc drive.

The method 600 may also include determining if the first portion of memory has sufficient capacity to store the first data that corresponds to the first LBA. at 606. For example, a used capacity of the first portion of memory may be determined. In a particular embodiment, the determination may be made that the first portion does not have sufficient capacity when the first portion of memory currently stores data.

When the first portion of memory does have sufficient capacity to store the first data, at 608, the first data may be stored in the first portion of memory, at 618. The first LBA may then be mapped to the first PBA of the first portion of memory that corresponds to the first data, at 620. The method may then terminate, at 622.

When the first portion of memory does not have sufficient capacity to store the first data, at 608, a determination may be made whether the second data was previously accessed during the time period, at 610. When the second data stored at the first portion of memory has been recently accessed after a previous start-up, at 612, the method may terminate, at 622, or another portion of memory may be located to store the first data, at 604.

When the second data was not previously accessed at a previous start-up, at 612, second data stored at the first portion of memory may be moved to create sufficient capacity to store the first data, at 614. In a particular embodiment, the second data may be moved to the second portion of memory to create sufficient capacity to store the first data at the first portion of memory. In another particular embodiment, the second data may be moved to create a sufficient capacity to store the first data by swapping PBAs of the second data and the first data.

After sufficient capacity has been created, the first data may be stored in the first portion of memory, at 618. In addition, the first LBA may be mapped to the first PBA of the first portion of memory that corresponds to the first data, at 620. The method may then terminate, at 622.

In accordance with various embodiments, the methods described herein, including but not limited to the methods depicted in and described in accordance with FIGS. 4-6, may be implemented as one or more software programs executable by a controller accessible to a data storage device. The data storage device may be a solid-state data storage device, such as a flash data storage device. The solid-state data storage device may be non-volatile or volatile. Also, the data storage device may be an optical data storage device, a magneto-optical data storage device, any other type of known or future developed data storage device, or any combination of types of data storage devices. Further, the data storage device may be a hybrid data storage device having more than one type of data storage medium.

In accordance with various embodiments, the methods described herein may be implemented as one or more software programs running on a computer processor or controller, such as the controller 220. In accordance with another embodiment, the methods described herein may be implemented as one or more software programs running on a host device, such as a PC that is using a disc drive. Dedicated hardware implementations including, but not limited to, application specific integrated circuits, programmable logic arrays and other hardware devices can likewise be constructed to implement the methods described herein.

The illustrations of the embodiments described herein are intended to provide a general understanding of the structure of the various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Additionally, the illustrations are merely representational and may not be drawn to scale. Certain proportions within the illustrations may be exaggerated, while other proportions may be reduced. Accordingly, the disclosure and the figures are to be regarded as illustrative rather than restrictive One or more embodiments of the disclosure may be referred to herein, individually and/or collectively, by the term "invention" merely for convenience and without intending to limit the scope of this application to any particular invention or inventive concept. Moreover, although specific embodiments have been illustrated and described herein, it should be appreciated that any subsequent arrangement designed to achieve the same or similar purpose may be substituted for the specific embodiments shown. This disclosure is intended to cover any and all subsequent adaptations or variations of various embodiments. Combinations of the above embodiments, and other embodiments not specifically described herein, will be apparent to those of skill in the art upon reviewing the description.

The Abstract of the Disclosure is provided to comply with 37 C.F.R. §1.72(b) and is submitted with the understanding that it will not be used to interpret or limit the scope or meaning of the claims. In addition, in the foregoing Detailed Description, various features may be grouped together or described in a single embodiment for the purpose of streamlining the disclosure. This disclosure is not to be interpreted as reflecting an intention that the claimed embodiments require more features than are expressly recited in each claim. Rather, as the following claims reflect, inventive subject matter may be directed to less than all of the features of any of the disclosed embodiments.

The above-disclosed subject matter is to be considered illustrative, and not restrictive, and the appended claims are intended to cover all such modifications, enhancements, and other embodiments, which fall within the true spirit and scope of the present invention. Thus, to the maximum extent allowed by law, the scope of the present invention is to be determined by the broadest permissible interpretation of the following claims and their equivalents, and shall not be restricted or limited by the foregoing detailed description.

What is claimed is:

1. A method comprising:
monitoring respective sets of LBAs that are included in each of a plurality of different occurrences of the same data access event in a data storage device,
detecting at least one LBA that is included in each of a predefined plurality of the sets of LBAs; and
mapping the at least one detected LBA to a corresponding physical block address (PBA) in a list stored in memory, the stored list defining a pattern of LBAs that are included in the data access event in the data storage device.

2. The method of claim 1, wherein the (PBAs) define storage addresses in a rotatable storage medium.

3. The method of claim 1, wherein the detecting is performed by computer instructions stored entirely in memory residing in the data storage device.

4. The method of claim 1, wherein the mapping step comprises adding the detected LBA to the list already stored in the memory and containing other previously detected LBAs.

5. The method of claim 1, wherein the detecting step is performed after the data storage device is in a ready state.

6. The method of claim 1, wherein the mapping step is performed a predefined time period after transitioning from a not-ready state to a ready state.

7. The method of claim 1, wherein the data access event is characterized by a transition of the data storage device from a not-ready state to a ready state.

8. The method of claim 7, wherein the data access event is characterized by the data storage device recovering from a hibernation mode.

9. The method of claim 1 wherein the detecting step is characterized by the detected LBA being included in each of a plurality of sets of LBAs that are included in corresponding non-consecutive occurrences of the data access event.

10. A data storage device comprising:
a data storage memory;
a controller adapted to store data in the data storage memory; and
programming instructions stored in the memory and executable by the controller to monitor respective sets of LBAs that are included in each of a plurality of different occurrences of the same data access event in the data storage device, detect at least one LBA that is included in each of a predefined plurality of the sets of LBAs, and map the at least one detected LBA to a corresponding physical block address (PBA) in a list stored in memory defining a pattern of LBAs that are included in the data access event in the data storage device.

11. The device of claim 10, wherein the data storage memory comprises a medium that is selected from the group consisting of a solid-state data storage medium, a magnetic data storage medium, an optical data storage medium, and a magneto-optical data storage medium.

12. The device of claim 10, wherein the data storage memory comprises:
a first data storage medium and a second data storage medium, the second data storage medium having a faster data access time capability than the first data storage medium; and
wherein the controller executing the programming instructions selectively stores data in the first data storage medium and the second data storage medium.

13. The device of claim 12, wherein the controller executing the programming instructions selectively stores data in the second data storage medium corresponding to LBAs residing in the stored list.

14. The device of claim 12, wherein the first data storage medium and the second data storage medium are distinct portions of a single data storage medium.

15. The device of claim 12, wherein the first data storage medium is a magnetic disc and the second data storage medium is a non-volatile solid state memory.

16. The device of claim 10, wherein the controller executing the programming instructions adds the detected LBA to the list stored in the memory and containing previously detected LBAs.

* * * * *